US012514172B2

(12) United States Patent
Aposhian et al.

(10) Patent No.: US 12,514,172 B2
(45) Date of Patent: Jan. 6, 2026

(54) SOD ROLL FORMING MECHANISM

(71) Applicant: FireFly Automatix, Inc., Salt Lake City, UT (US)

(72) Inventors: Steven R. Aposhian, Farmington, UT (US); Eric E. Aston, Farmington, UT (US); William M. Decker, Salt Lake City, UT (US); Mark C. LeBlanc, Salt Lake City, UT (US); Austin J. Neuner, Layton, UT (US); Seth W. Jeppson, Clearfield, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 1035 days.

(21) Appl. No.: 17/220,406

(22) Filed: Apr. 1, 2021

(65) Prior Publication Data

US 2021/0307261 A1  Oct. 7, 2021

Related U.S. Application Data

(60) Provisional application No. 63/004,250, filed on Apr. 2, 2020.

(51) Int. Cl.
   *A01G 20/15*   (2018.01)
(52) U.S. Cl.
   CPC .................................. *A01G 20/15* (2018.02)
(58) Field of Classification Search
   CPC ............................... A01G 20/15; A01G 20/12
   USPC ........................................................... 172/19
   See application file for complete search history.

(56) References Cited

U.S. PATENT DOCUMENTS

| 3,464,641 | A | * | 9/1969 | Brouwer | ................ | A01G 20/12 |
|   |   |   |   |   |   | 242/541.2 |
| 3,540,535 | A | * | 11/1970 | Brouwer et al. | ....... | A01G 20/15 |
|   |   |   |   |   |   | 172/20 |
| 3,790,096 | A |   | 2/1974 | Brouwer |   |   |
| 4,142,691 | A |   | 3/1979 | Watton |   |   |
| 5,165,617 | A | * | 11/1992 | van Vuuren | ........... | A01G 20/15 |
|   |   |   |   |   |   | 242/541.2 |
| 6,273,196 | B1 | * | 8/2001 | Van Vuuren | ........... | A01G 20/15 |
|   |   |   |   |   |   | 172/20 |
| 7,021,584 | B2 | * | 4/2006 | Hendriks et al. | ...... | A01G 20/15 |
|   |   |   |   |   |   | 242/534 |

(Continued)

OTHER PUBLICATIONS

Firefly Automatix, "R300 Cutting Meadow Grass," video, 0:05-1:34, retrieved from <https://www.youtube.com/watch?v=trW0bgn5o2A> (last accessed Jul. 19, 2021).

(Continued)

*Primary Examiner* — Christopher J Sebesta
*Assistant Examiner* — Joel F. Mitchell
(74) *Attorney, Agent, or Firm* — Kirton McConkie; Brian Tucker

(57) ABSTRACT

A sod harvester can employ a roll forming mechanism that includes a roll starter that is configured to initiate the formation of rolls. The roll starter can include pivoting supports and front and rear slab flippers that also pivot to cause the rolls to be tightly and consistently formed. The roll forming mechanism can also include a roll advancer that continues the formation of the rolls. The roll advancer can be suspended to cause it to conform to the shape and size of the rolls as they advance.

20 Claims, 21 Drawing Sheets

(56) References Cited

U.S. PATENT DOCUMENTS

| | | | | |
|---|---|---|---|---|
| 7,070,004 | B2* | 7/2006 | Hendriks et al. ...... | A01G 20/15 |
| | | | | 198/313 |
| 8,813,861 | B2* | 8/2014 | Stefanski et al. ...... | A01G 20/15 |
| | | | | 172/19 |
| 9,426,937 | B2 | 8/2016 | Sammut | |
| 10,039,221 | B2* | 8/2018 | Tvetene et al. ........ | A01B 76/00 |

OTHER PUBLICATIONS

Firefly Automatix, "FireFly Automatix R300 Automated Roll Harvester," video, 0:00-3:43, retrieved from <https://www.youtube.com/watch?v=2uUmg-HHjo> (last accessed Jul. 19, 2021).

International Searching Authority, International Search Report and the Written Opinion, Jul. 12, 2021.

\* cited by examiner

SOD ROLL FORMING MECHANISM

CROSS-REFERENCE TO RELATED APPLICATIONS

This application claims the benefit of U.S. Provisional Patent Appl. No. 63/004,250 which was filed on Apr. 2, 2020.

BACKGROUND

Turf grass (sod) is a living organism that must be handled properly to ensure its survival when it is removed from one location and transplanted to another. Sod is generally harvested using large machinery such as a sod harvester. Sod harvesters typically include a cutting head that cuts slabs of sod from the ground, an inclined conveyor that elevates the slabs from the ground towards a stacking conveyor and a stacking head that removes the slabs from the stacking conveyor and stacks then on a pallet. Two general types of harvesters exist: slab harvesters; and roll harvesters. A roll harvester forms the slabs of sod into rolls, which are then accumulated on the stacking conveyor for pick up. A slab harvester, on the other hand, directly stacks the slabs in their flat form.

BRIEF SUMMARY

Embodiments of the present invention extend generally to roll forming mechanisms and to sod harvesters having such roll forming mechanisms. A roll forming mechanism can include a roll starter that is configured to initiate the formation of rolls. The roll starter can include pivoting supports and front and rear slab flippers that also pivot to cause the rolls to be tightly and consistently formed. The roll forming mechanism can also include a roll advancer that continues the formation of the rolls. The roll advancer can be suspended to cause it to conform to the shape and size of the rolls as they advance.

In some embodiments, the present invention may be implemented as a sod harvester having a cutting head that removes slabs of sod from the ground, an inclined conveyor that receives the slabs of sod from the cutting head and advances the slabs of sod towards a stacking conveyor; a roll forming mechanism that is positioned above the inclined conveyor and forms the slabs of sod into rolls, the stacking conveyor that receives the rolls; and a stacking head that removes the rolls from the stacking conveyor for stacking. The roll starter of the roll forming mechanism includes pivoting supports positioned on opposing sides of the inclined conveyor and a front slab flipper having a vertical blade that extends across the inclined conveyor. The front slab flipper is configured to pivot relative to the pivoting supports.

In some embodiments, the present invention may be implemented as a roll forming mechanism for a sod harvester where the roll forming mechanism includes a roll starter and a roll advancer. The roll starter may include opposing pivoting supports that pivot relative to an inclined conveyor on which slabs of sod are advanced and a front slab flipper having a vertical blade that extends between the opposing pivoting supports. The front slab flipper pivots relative to the opposing pivoting supports. The roll advancer is positioned rearward from the roll starter and may include opposing suspended supports and blades that extend between the opposing suspended supports.

In some embodiments, the present invention may be implemented as a roll forming mechanism for a sod harvester wherein the roll forming mechanism includes a roll starter and a roll advancer. The roll starter may include opposing pivoting supports that pivot relative to an inclined conveyor on which slabs of sod are advanced, a front slab flipper and a rear slab flipper. The front slab flipper has a vertical blade that extends between the opposing pivoting supports and a horizontal blade that extends frontward from the vertical blade of the front slab flipper. The front slab flipper pivots relative to the opposing pivoting supports. The rear slab flipper has a vertical blade that extends between the opposing pivoting supports and a horizontal blade that extends frontward from the vertical blade of the rear slab flipper. The rear slab flipper pivots relative to the opposing pivoting supports. The roll advancer is positioned rearward from the roll starter and includes opposing suspended supports and blades that extend between and are spaced along the opposing suspended supports.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification, the term "sod harvester" should be construed as machinery that is configured to receive and stack sod that has been cut from the ground. This machinery could be in the form of a vehicle, such as a tractor, or in the form of a trailer that is pulled by another vehicle.

Figure 1:
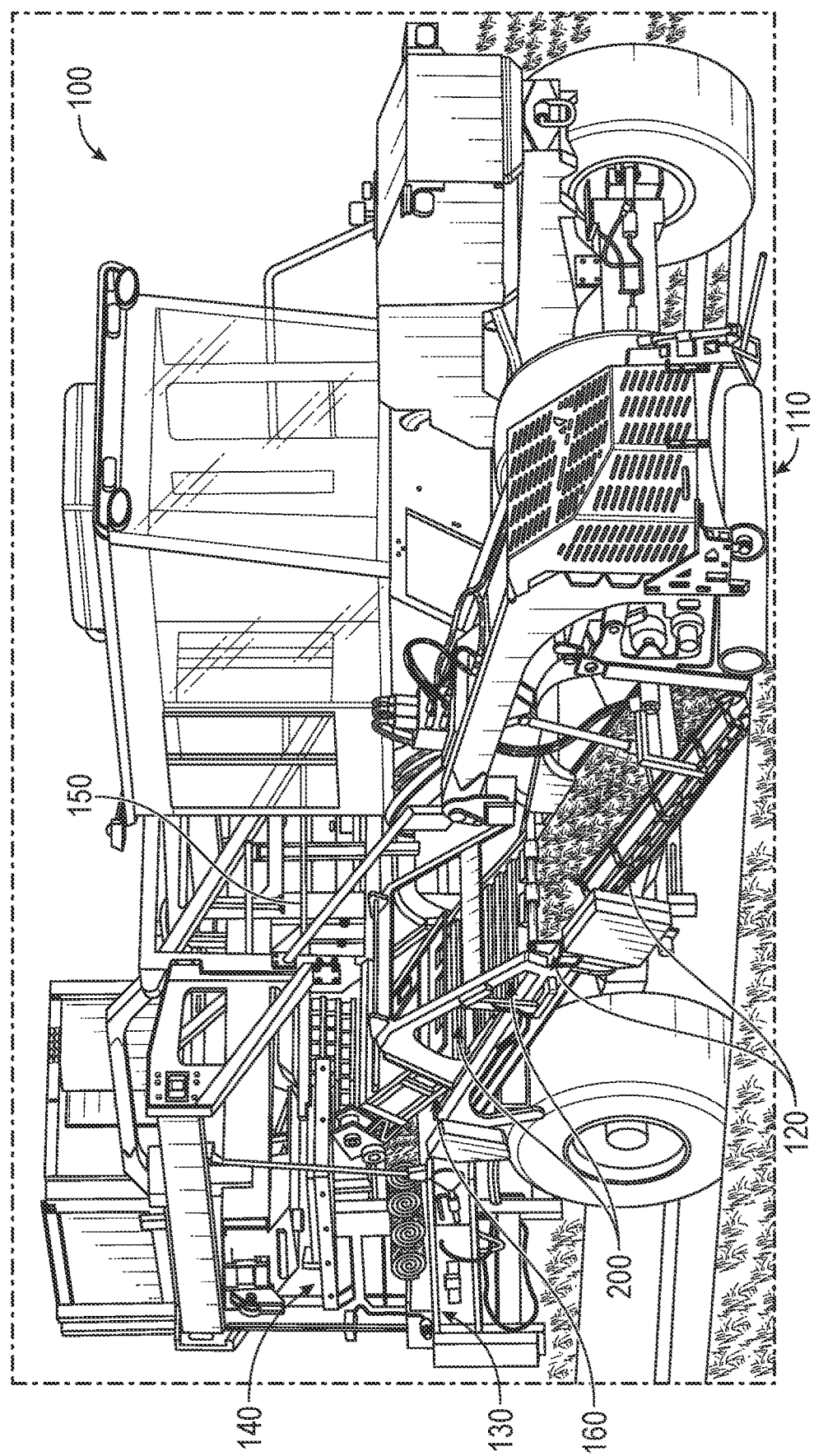
FIG. 1 illustrates a sod harvester that forms slabs of sod into rolls.

FIG. 1 provides an example of a sod harvester 100 that is in the form of a tractor and that is configured to form slabs of sod into rolls prior to stacking. Sod harvester 100 includes a cutting head 110 that cuts the slabs of sod from the ground and delivers the slabs to an inclined conveyor (or conveyors) 120. As the slabs travel up inclined conveyor 120 in a rearward direction, the slabs pass under a roll forming mechanism 200 that causes the slabs to be rolled up into rolls that are then delivered to a stacking conveyor 130.

In the depicted embodiment, a roll transfer mechanism 160 is positioned rearward from roll forming mechanism 200 and may be configured in any of the various manners described in co-pending U.S. patent application Ser. No. 16/370,995 (the "'995 Application"), which is incorporated herein by reference, to complete the formation of a roll and/or to deliver the roll to stacking conveyor 130. Accordingly, in some embodiments, roll transfer mechanism 160 may be considered as part of roll forming mechanism 200. However, in some embodiments, a sod harvester may include roll forming mechanism 200 but not roll transfer mechanism 160. In other words, roll forming mechanism 200 can be used in conjunction with other techniques and/or mechanisms for completing and/or delivering rolls to stacking conveyor 130. Sod harvester 100 also includes a stacking head 140 that is configured to pick up rolls from stacking conveyor 130 and stack them on a pallet in pallet support area 150.

Figure 2:
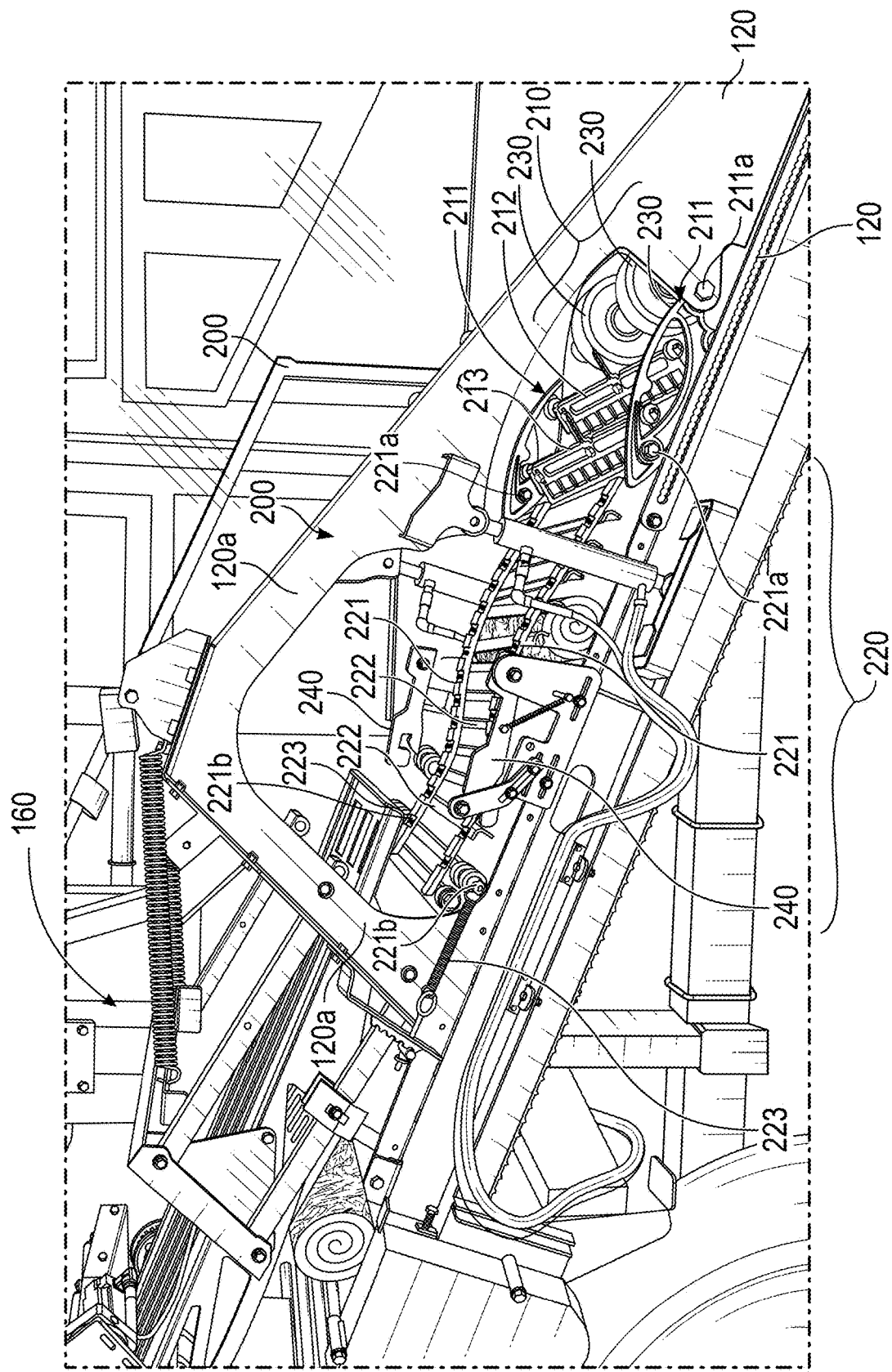
FIG. 2 illustrates a portion of the sod harvester of FIG. 1 that includes a sod roll forming mechanism that is configured in accordance with some embodiments of the present invention.

FIG. 2 provides a side view of sod harvester 100 illustrating a portion of inclined conveyor 120, roll forming mechanism 200 and a portion of roll transfer mechanism 160. Roll forming mechanism 200 includes a roll starter 210 and a roll advancer 220 that is positioned rearward of roll starter 210. In this context, the term "rearward" represents that a slab of sod is passed through roll starter 210 before being passed through roll advancer 220.

Roll starter 210 includes pivoting supports 211 that are positioned on opposite sides of inclined conveyor 120. A front end of each pivoting support 211 is mounted to a frame 120a of inclined conveyor 120 (or some other portion of sod harvester 100) to form a pivot point 211a about which roll starter 210 pivots relative to inclined conveyor 120, and more particularly, relative to a slab of sod that is being advanced on top of inclined conveyor 120. Roll starter 210 also includes a front slab flipper 212 and a rear slab flipper 213 that are coupled to and extend between pivoting supports 211. Accordingly, front and rear slab flippers 212 and 213 extend across and are positioned above inclined conveyor 120 so that they will contact and manipulate slabs of sod that are advanced under roll starter 210.

Roll advancer 220 includes suspended supports 221 that extend along opposite sides of inclined conveyor 120 and a number of blades 222 that are coupled to and extend between suspended supports 221 at spaced intervals. Accordingly, blades 222 extend across and are positioned above inclined conveyor 120 so that they will contact and manipulate rolls that are being formed as the slabs of sod are advanced under roll advancer 220. Each suspended support 221 is coupled to a rear end of the respective pivoting support 211 (at roll advancer connection point 211c as shown in subsequent figures) to form a front attachment point 221a. Each suspended support 221 is also coupled at a rear attachment point 221b to a portion of frame 120a (or some other portion of sod harvester 100). In some embodiments, each rear attachment point 221b is coupled via a corresponding tension member 223 (e.g., a spring). In some embodiments, tension members 223 can be employed to prevent roll advancer 220 from over-sagging and/or to retain a suitable amount of downward force against a forming roll as it passes under roll advancer 220.

To prevent blades 222 from sagging onto inclined conveyor 120, roll advancer 220 may include rest members 224 that are positioned along suspended supports 221 and that are configured to interface with (e.g., rest on) frame 120a to retain spacing between blades 222 and inclined conveyor 120. In the depicted embodiment, rest members 224 extend downwardly from suspended supports 221 and contact a raised portion of frame 120a that extends along the opposing sides of inclined conveyor 120 (see, e.g., FIG. 3A). In some embodiments, a sensor 240 may be employed to detect the position of a roll/slab as it advances through roll forming mechanism 200. In the depicted embodiment, sensor 240 is in the form of arms that are lifted and then dropped as a forming roll passes under the arms. Sensor 240 may be employed to control the functionality of roll transfer mechanism 160 as is described in the '995 Application.

FIGS. 3A-3G and 4A-4I each depict how roll forming mechanism 200 can function to form rolls of sod. Notably, the configuration of roll forming mechanism 200 enables rolls to be tightly and consistently formed. As a result, the rolls will have a more uniform shape and size, which in turn will produce well-formed pallets.

Each pivoting support 211 forms a pivoting area 211b that is defined by a top arm 211b1 and a bottom arm 211b2. In some embodiments, a protrusion 211f may be formed on top arm 211b1 and may extend downwardly into pivoting area 211b. Pivoting area 211b is positioned rearward from pivoting point 211a. In some embodiments, including the depicted embodiment, roll advancer connection point 211c is positioned rearward from pivoting area 211b. Each pivoting support 211 also forms a front slab flipper connection point 211d and a rear slab flipper connection point 211e by which front slab flipper 212 and rear slab flipper 213 respectively couple to pivoting supports 211.

Front slab flipper 212 incudes a vertical blade 212a, a horizontal blade 212b that extends frontward from (or relative to) vertical blade 212a and opposing attachment arms 212c that extend frontward from (or relative to) vertical blade 212a to form pivot points 212d at front slab flipper connection point 211d. Front slap flipper 212 also includes stoppers 212e that are positioned at opposing ends of front slab flipper 212 (e.g., at opposing ends of vertical blade 212a). Stoppers 212e are positioned within pivoting area 211b and contact top arm 211b1 and bottom arm 211b2 during the process of initiating and advancing a roll. Accordingly, front slab flipper 212 pivots relative to pivoting support 211 around pivot points 212d that is positioned frontward from vertical blade 212a.

Rear slab flipper 213, which is configured in a similar manner as front slab flipper 212, includes a vertical blade 213a, a horizontal blade 213b that extends frontward from (or relative to) vertical blade 213a and opposing attachment arms 213c that extend frontward from (or relative to) vertical blade 213a to form pivot points 213d at rear slab flipper connection point 211e. Rear slap flipper 213 also includes stoppers 213e that are positioned at opposing ends of rear slab flipper 213 (e.g., at opposing ends of vertical blade 213a). Stoppers 213e are positioned within pivoting area 211b and contact top arm 211b1 and bottom arm 211b2 during the process of initiating and advancing a roll. Accordingly, rear slab flipper 213 pivots relative to pivoting support 211 around pivot points 213d that is positioned frontward from vertical blade 213a.

In some embodiments, one or more rollers 230 may be positioned frontward from roll starter 210 and may function to hold a slab of sod against inclined conveyor 120 as the leading edge of the slab of sod contacts front slab flipper 212 and commences to roll back on itself. In some embodiments, rollers 230 may be configured to rest on top of inclined conveyor 120 and may therefore roll with inclined conveyor 120 and any slab of sod on inclined conveyor 120.

Figure 3A:
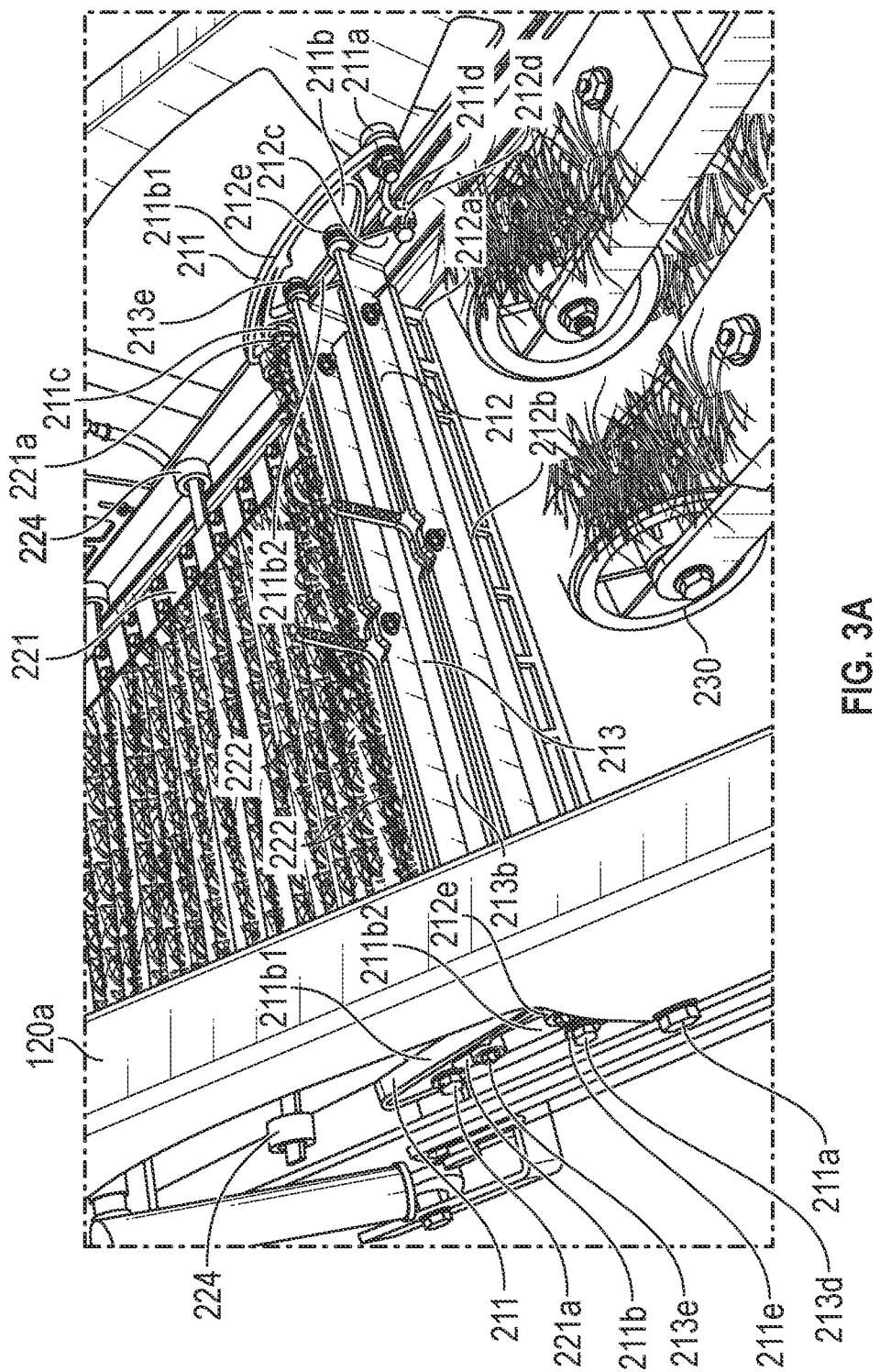
FIGS. 3A-3G provide a front view of a sequence in which a sod roll forming mechanism configured in accordance with some embodiments of the present invention initiates the formation of a sod roll.

FIG. 3A depicts the state of roll forming mechanism 200 before it receives a slab of sod. In this state, the force of gravity can cause pivoting supports 211 to be oriented in their downward-most position with roll advancer 220 being suspended from front attachment points 221a and rear attachment points 221b. Also, rest members 224 may rest on top of frame 120a to retain spacing between blades 222 and inclined conveyor 120. In this state, the force of gravity can also cause front slab flipper 212 and rear slab flipper 213 to be pivoted into their downward-most position. More particularly, stoppers 212e and 213e can rest on bottom arm 211b2. In some embodiments, pivoting supports 211a, front slab flipper 212 and rear slab flipper 213 can be configured to cause vertical blades 212a and 213a to be generally perpendicular to inclined conveyor 120 when in this state. In other words, as a slab of sod approaches roll starter 210, vertical blades 212a and 213a may generally align with the leading edge of the slab of sod.

Figure 3B:
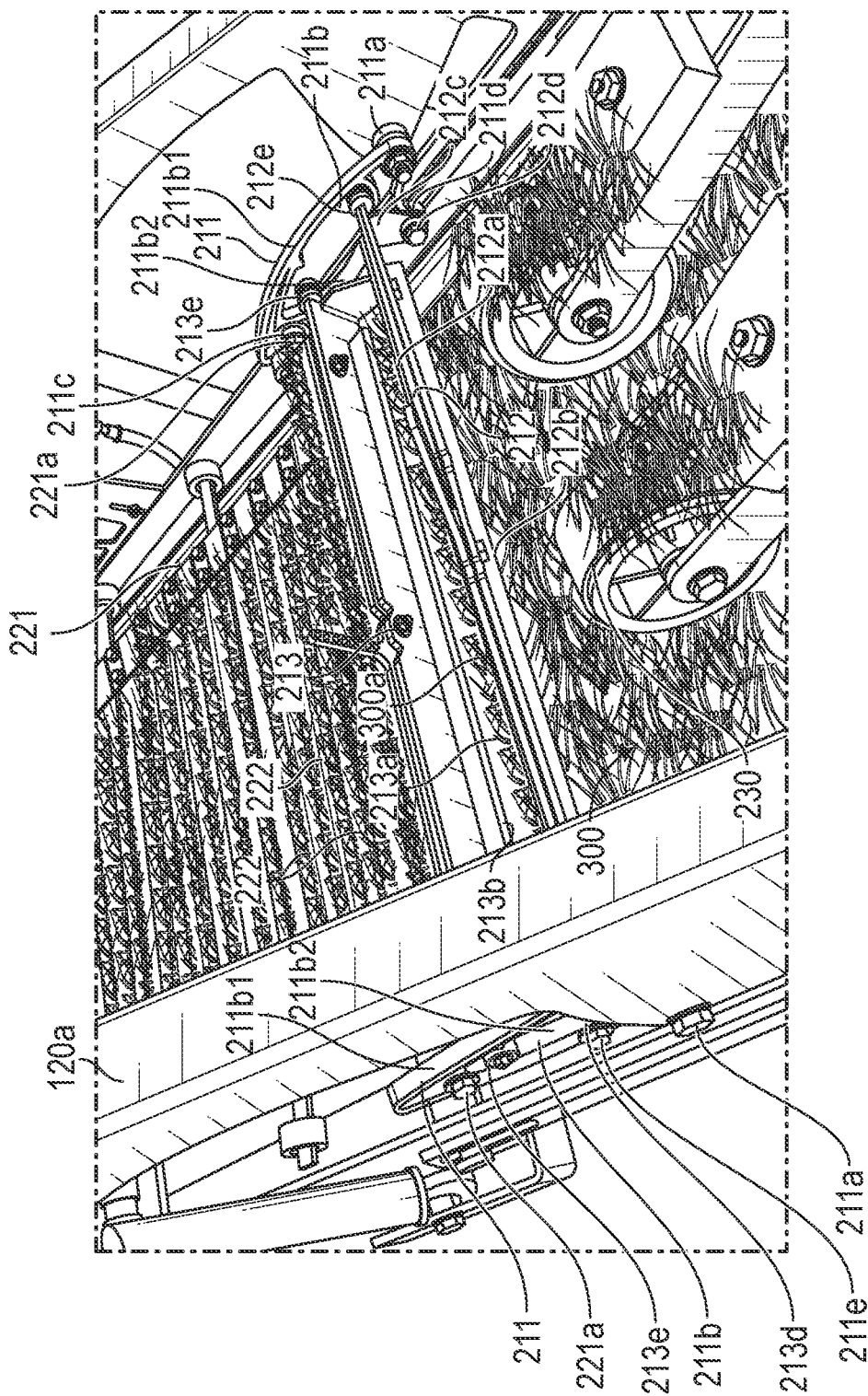

Turning to FIG. 3B, a slab of sod 300 has now been advanced to the point that its leading edge 300a has contacted vertical blade 212a. Because front slab flipper 212 is coupled to pivoting supports 211 via pivot points 212d, front slab flipper 212 will pivot upwardly as leading edge 300a of slab 300 contacts vertical blade 212a. This pivoting will also cause horizontal blade 212b to be rotated downwardly towards inclined conveyor 120. In this orientation, vertical blade 212a and horizontal blade 212b will direct leading edge 300a tightly against itself thereby forming a tight roll.

In addition to the pivoting of front slab flipper 212 relative to pivoting supports 211, pivoting supports 211 themselves will also pivot in response to stoppers 212e contacting top arm 211b1. In other words, the leading edge 300a of slab 300 will force front slab flipper 212 to pivot upwardly thereby lifting pivoting supports 211 around pivot points 211a. As pivoting supports 211 pivot upwardly, bottom arms 211b2 will lift stoppers 213e thereby repositioning rear slab flippers 213. In particular, the upward pivoting of pivoting supports 211 will cause vertical blade 213a and horizontal blade 213b to rotate slightly towards inclined conveyor 120 to generally follow the rotation of vertical blade 212a and horizontal blade 212b.

Figure 3C:
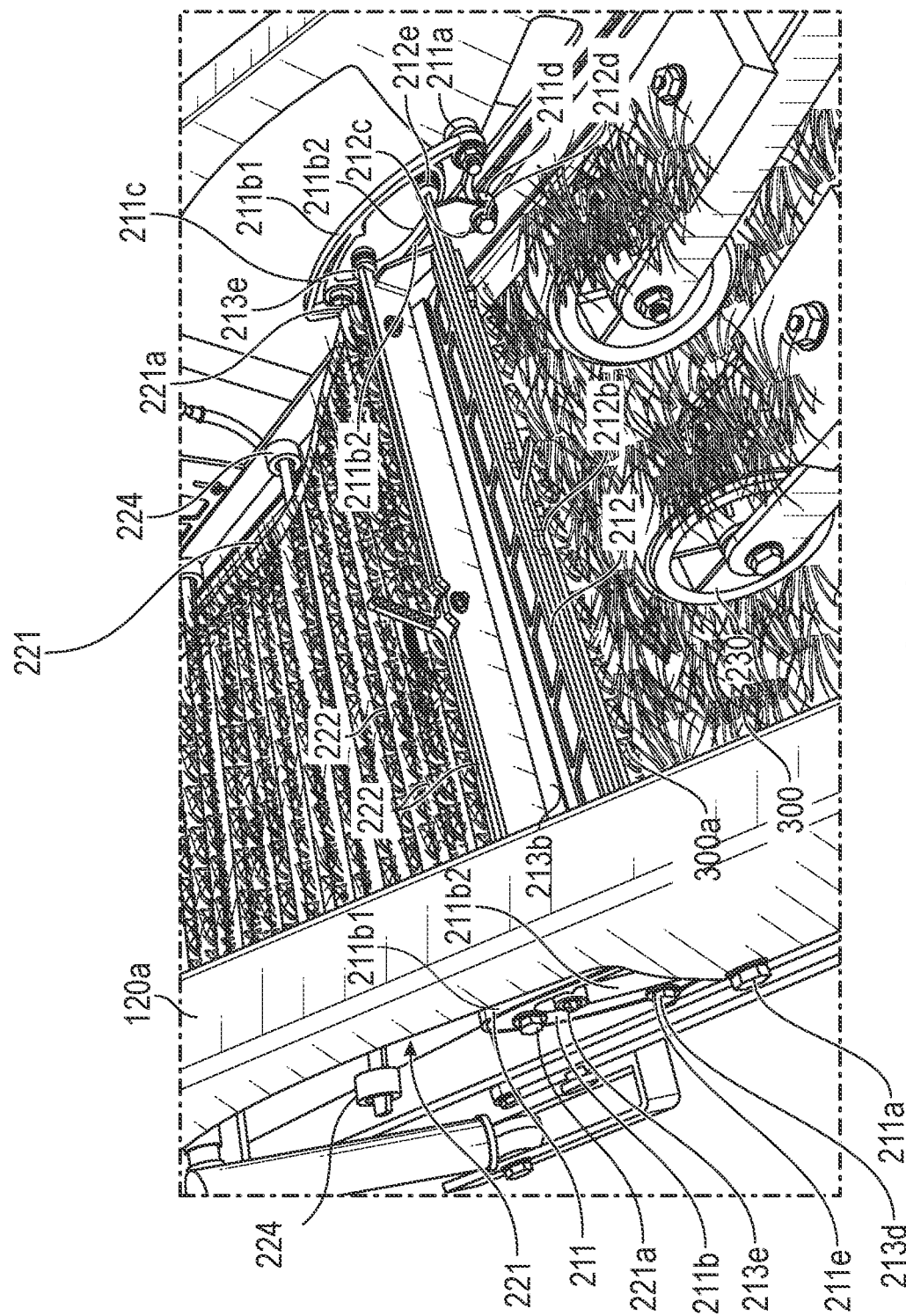

FIG. 3C illustrates how pivoting supports 211 continue to pivot upwardly as the size of the forming roll increases under front slab flipper 212 (i.e., as leading edge 300a is tucked back on top of slab 300). In particular, in FIG. 3C, stoppers 212 are in contact with top arm 211b1 and apply the lifting force to cause pivoting supports 211 to pivot upwardly. At this point, stoppers 213a remain in contact with bottom arm 211b2 since the forming roll has not yet reached rear slab flipper 213. However, the pivoting of pivoting supports 211 have caused vertical blade 213a and horizontal blade 213b to be further rotated towards inclined conveyor 120. Because of the lifting and forward rotation of rear slab flipper 213, vertical blade 213a and horizontal blade 213b will be oriented to more closely match the shape and size of the forming roll as it transitions from under front slab flipper 212 to under rear slab flipper 213. As a result, rear slab flipper 213 will be in a position to better retain and continue the tightness of the roll that is being formed.

Figure 3D:
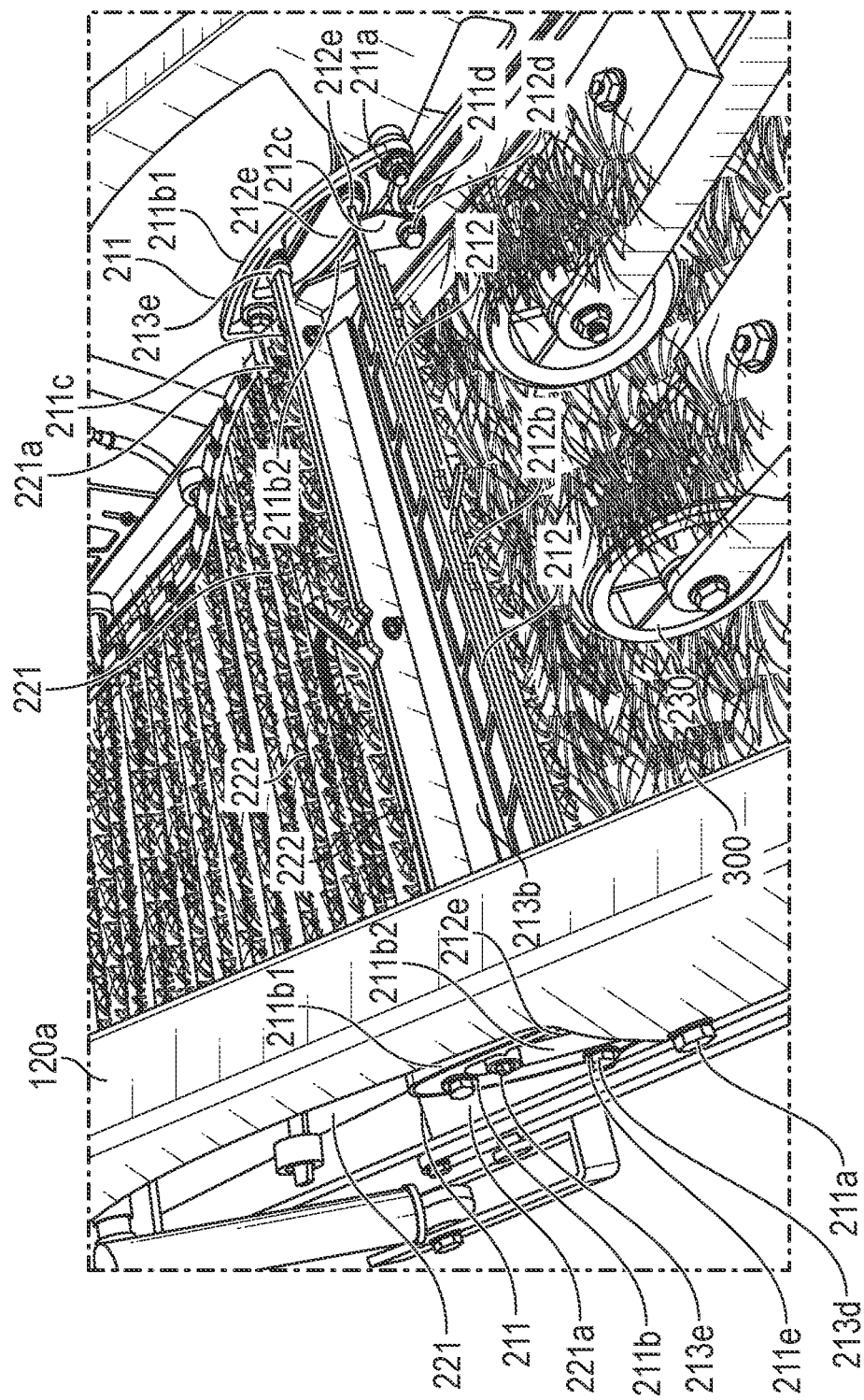

Turning to FIG. 3D, the forming roll has now passed under rear slab flipper 213 causing rear slab flipper 213 to be pivoted upwardly around pivot point 213d. This upward pivoting causes stoppers 213e to contact top arm 211b1 and further lift pivoting supports 211. Protrusions 211f can be positioned to enlarge the contact area between stoppers 213e and top arm 211b1. Accordingly, as the forming roll grows in size and advances under rear slab flipper 213, pivoting supports 211 will continue to be lifted so that vertical blade 213a and horizontal blade 213b remain in close contact with and generally conform to the shape of the forming roll. Stated another way, the orientation of vertical blade 213a and horizontal blade 213b can act as guides that are positioned generally above the forming roll and conform to the curved shape of the forming roll to thereby ensure that the slab continues to form a tight roll.

Figure 3E:
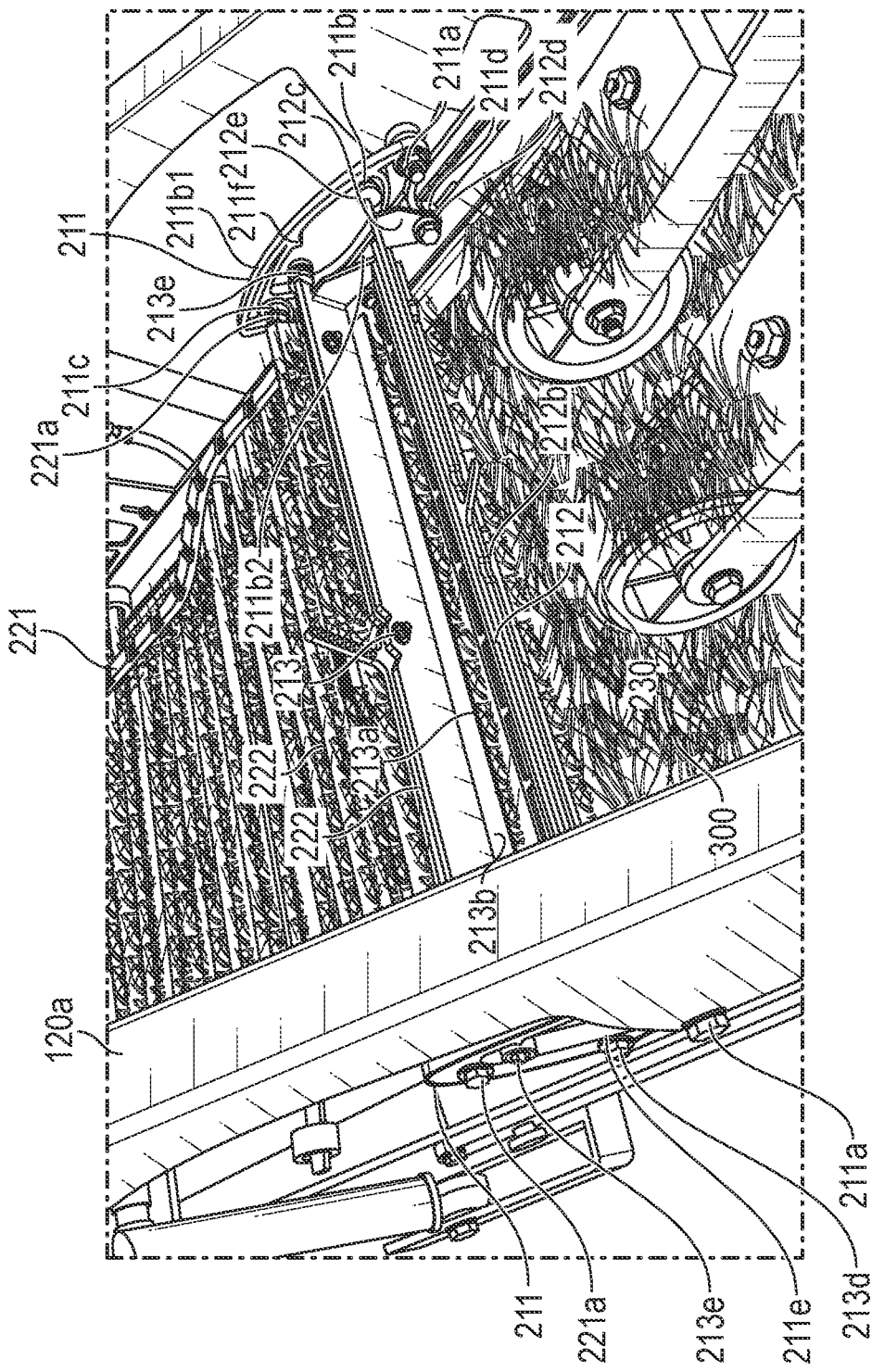

In FIG. 3E, the forming roll has now advanced under roll advancer 220. Accordingly, rear slab flipper 213 has pivoted downwardly such that stoppers 213e are no longer applying an upward force against top arms 211b1. The forming roll is now applying an upward force on roll advancer 220. Because front attachment points 221a of suspended supports 221 are connected to pivoting supports 211 via roll advancer connection points 211c, the lifting of roll advancer 220 will also maintain the lifted orientation of roll starter 210. However, the weight of roll starter 210 will pull roll advancer 220 downwardly thereby causing blades 222 to conform to the shape of the forming roll. Notably, blades 222 that are positioned frontward of the forming rolls center will be pulled downwardly to conform to the curvature of the roll, which in turn will ensure that the slab continues to form a tight roll.

Figure 3F:
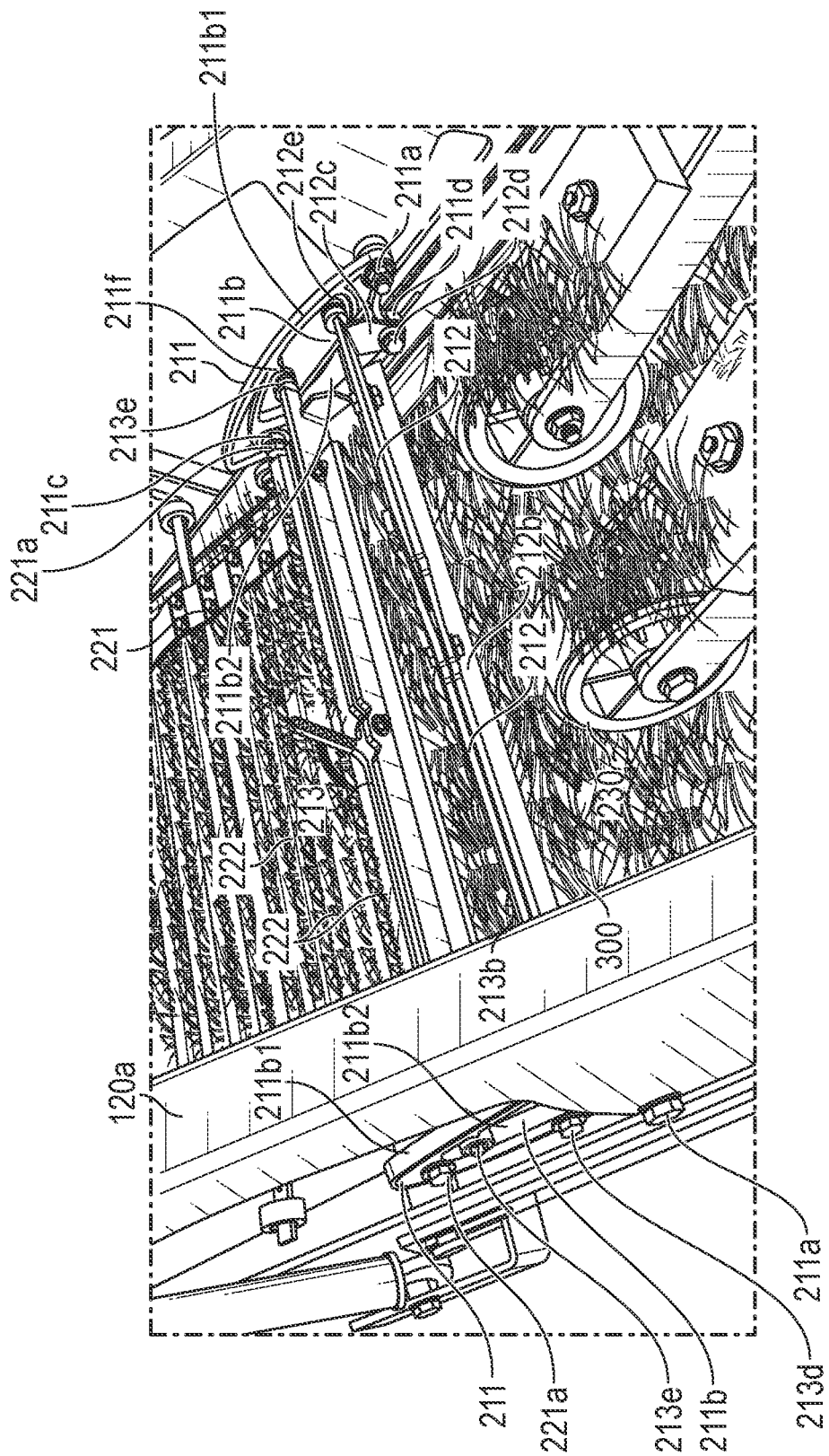
Figure 3G:
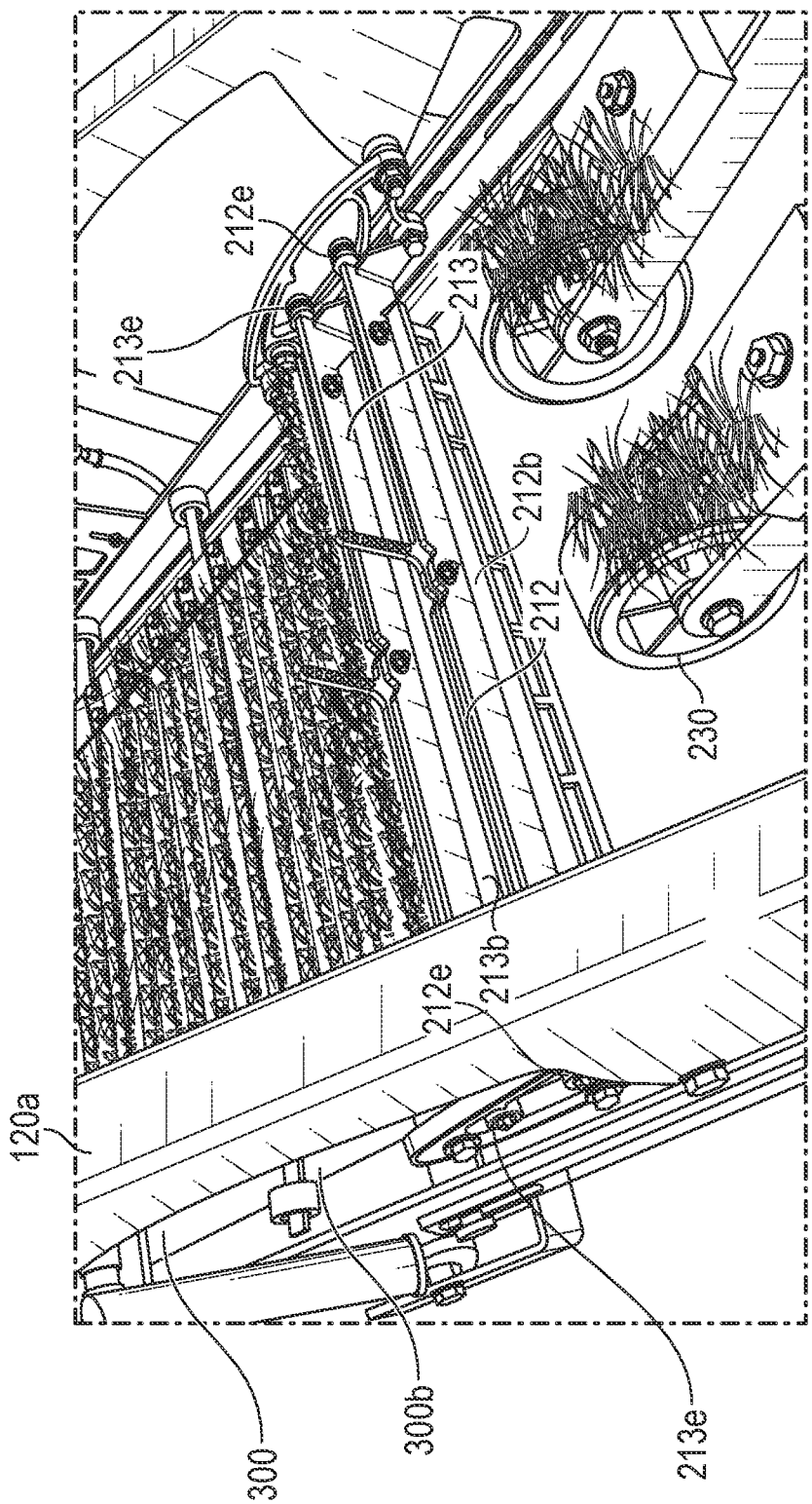

In FIG. 3F, the roll has continued to form under roll advancer 220. At this point, the forming roll has advanced sufficiently beyond roll starter 210 so that front and rear slab flippers 212 and 213 are riding on top of the trailing end of slab 300. In the depicted embodiment, roll forming mechanism 200 may form a partial roll and pass the partial roll to roll transfer mechanism 160, which can then complete the roll and deliver the completed roll to stacking conveyor 130. For example, FIG. 3G illustrates that the forming roll has been delivered to roll transfer mechanism 160 while the trailing edge 300b passes under roll advancer 220. In FIG. 3G, roll starter 210 has returned to the same position illustrated in FIG. 3A to await the next slab.

Figure 4A:
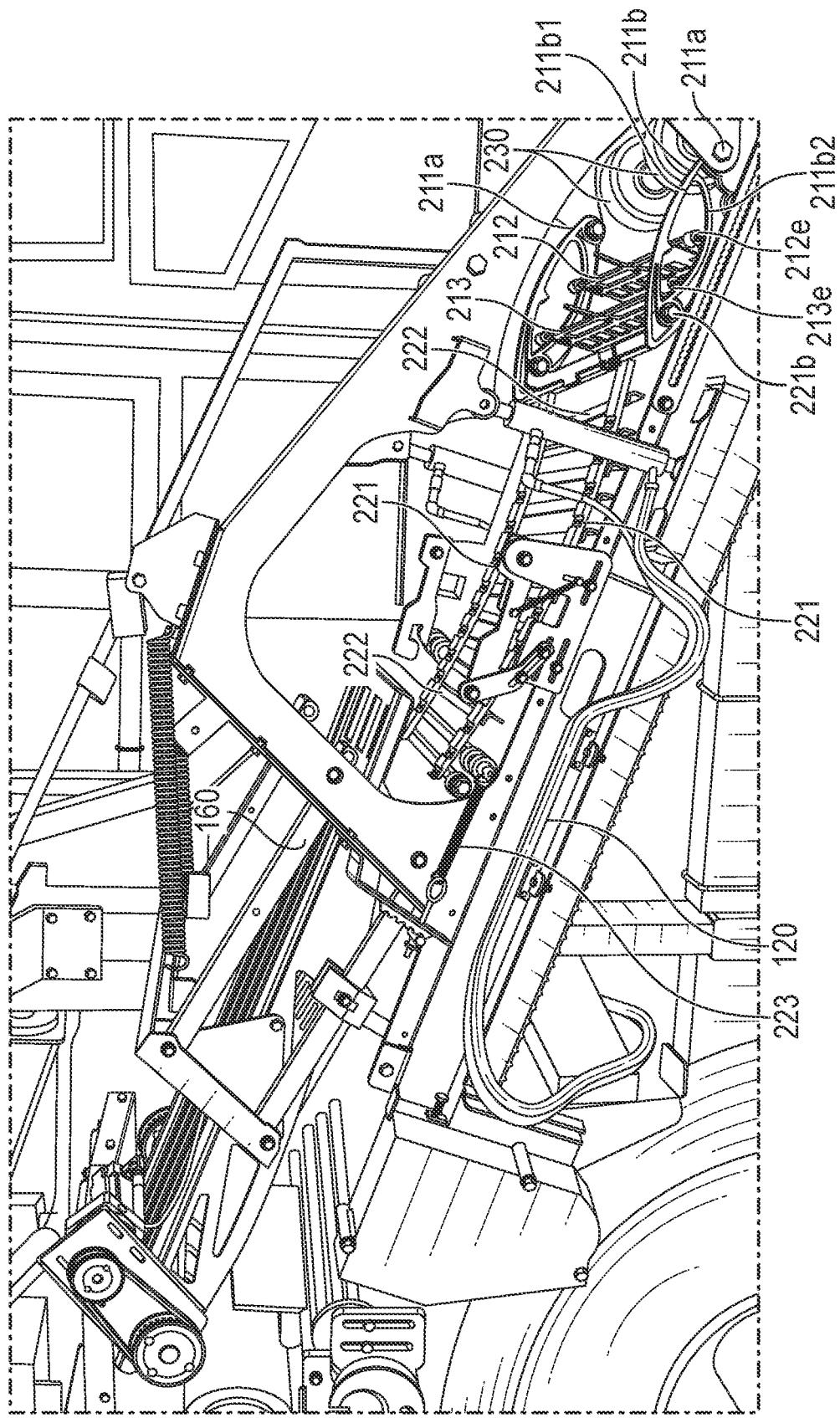
FIGS. 4A-4I provide a side view of a sequence in which a sod roll forming mechanism configured in accordance with some embodiments of the present invention initiates the formation of a sod roll.
Figure 4B:
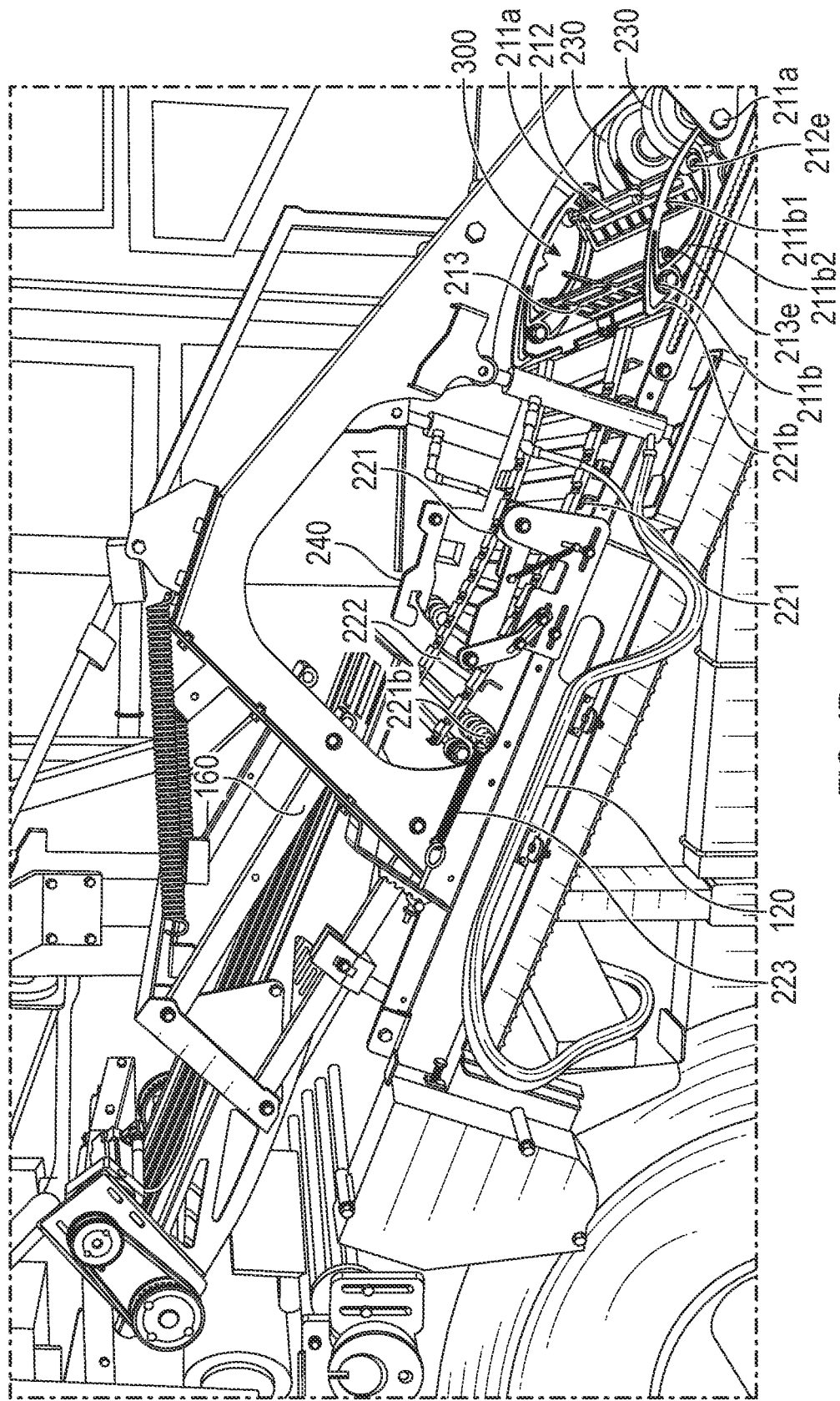
Figure 4C:
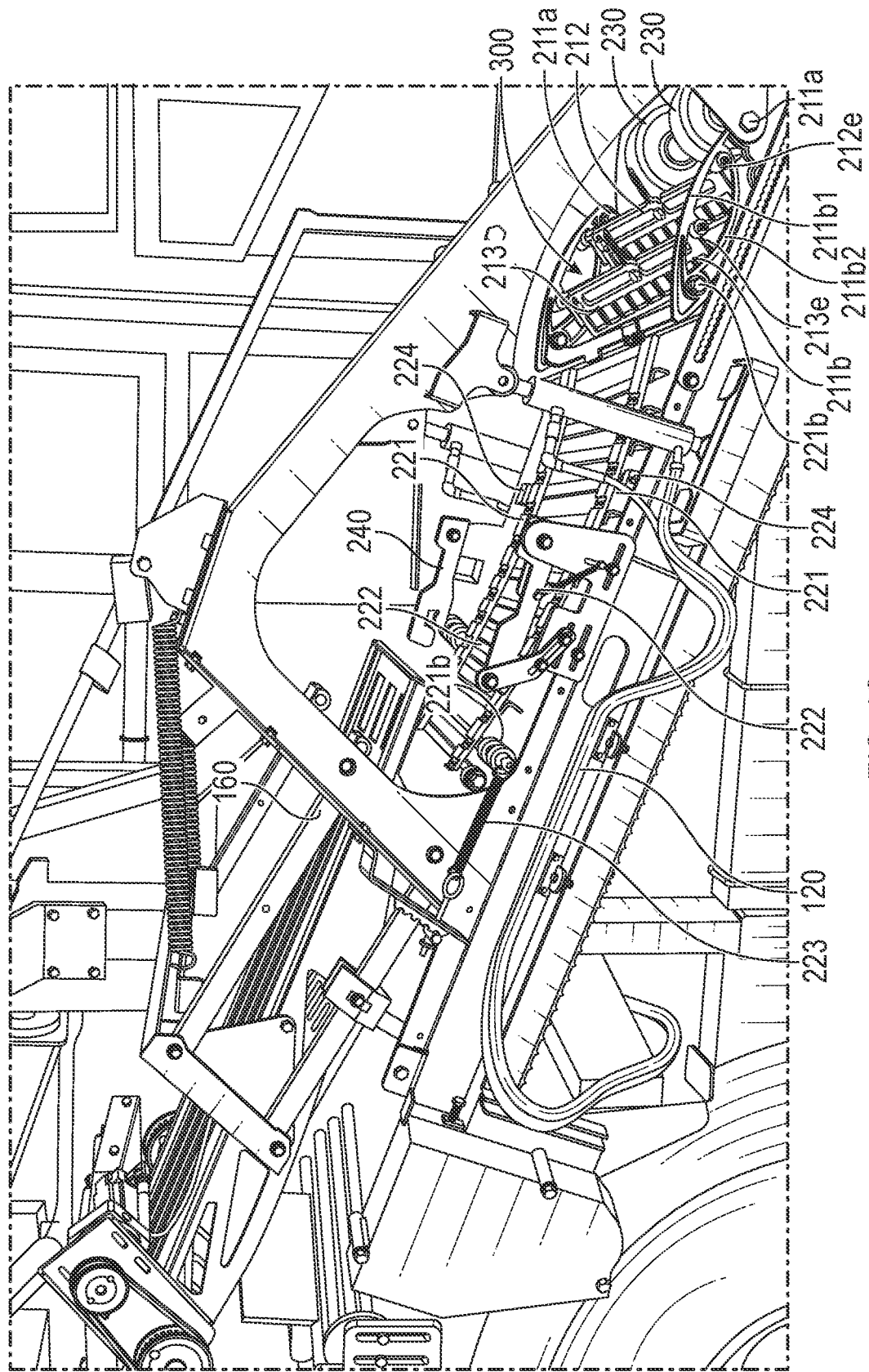
Figure 4D:
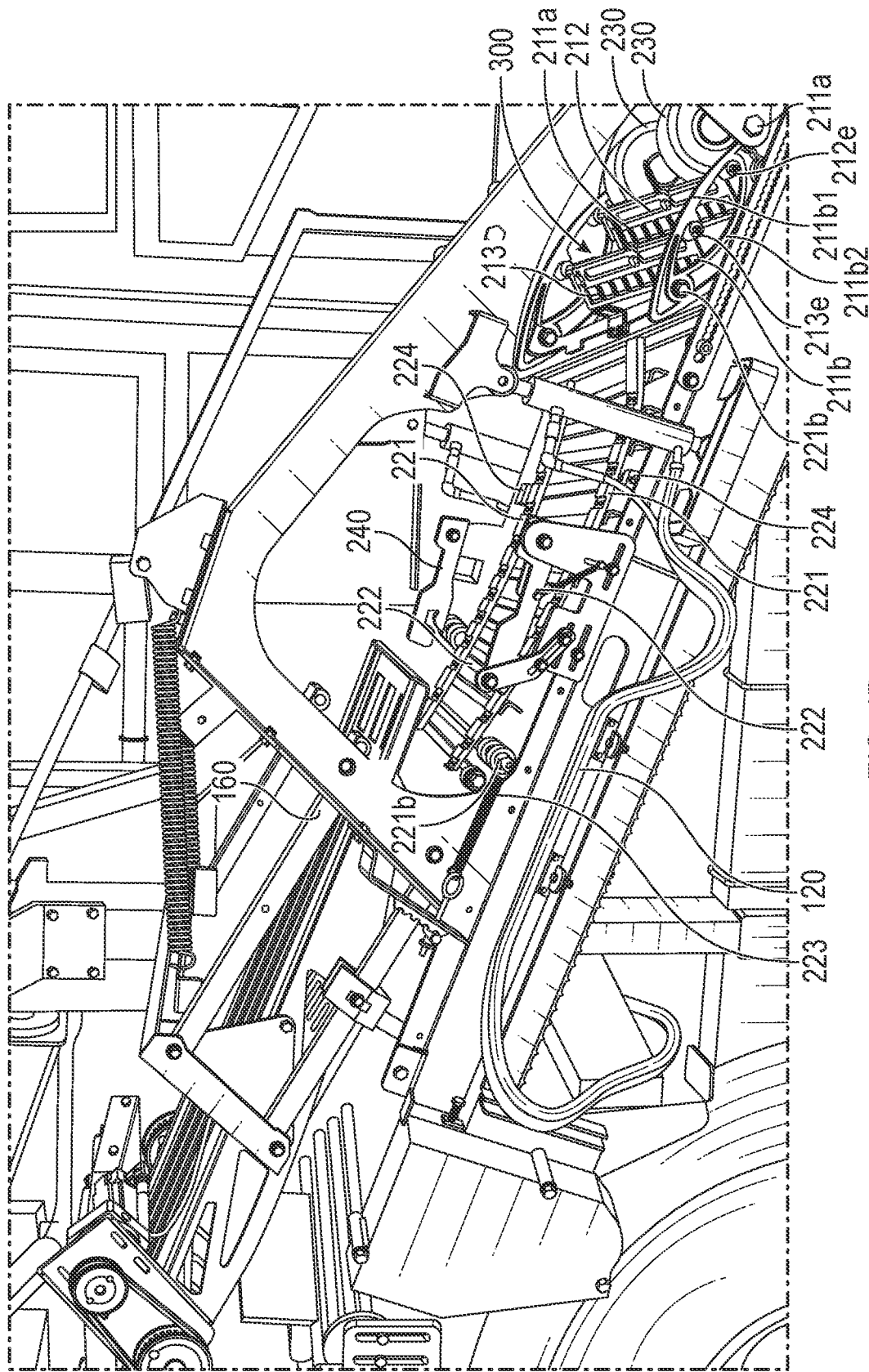
Figure 4E:
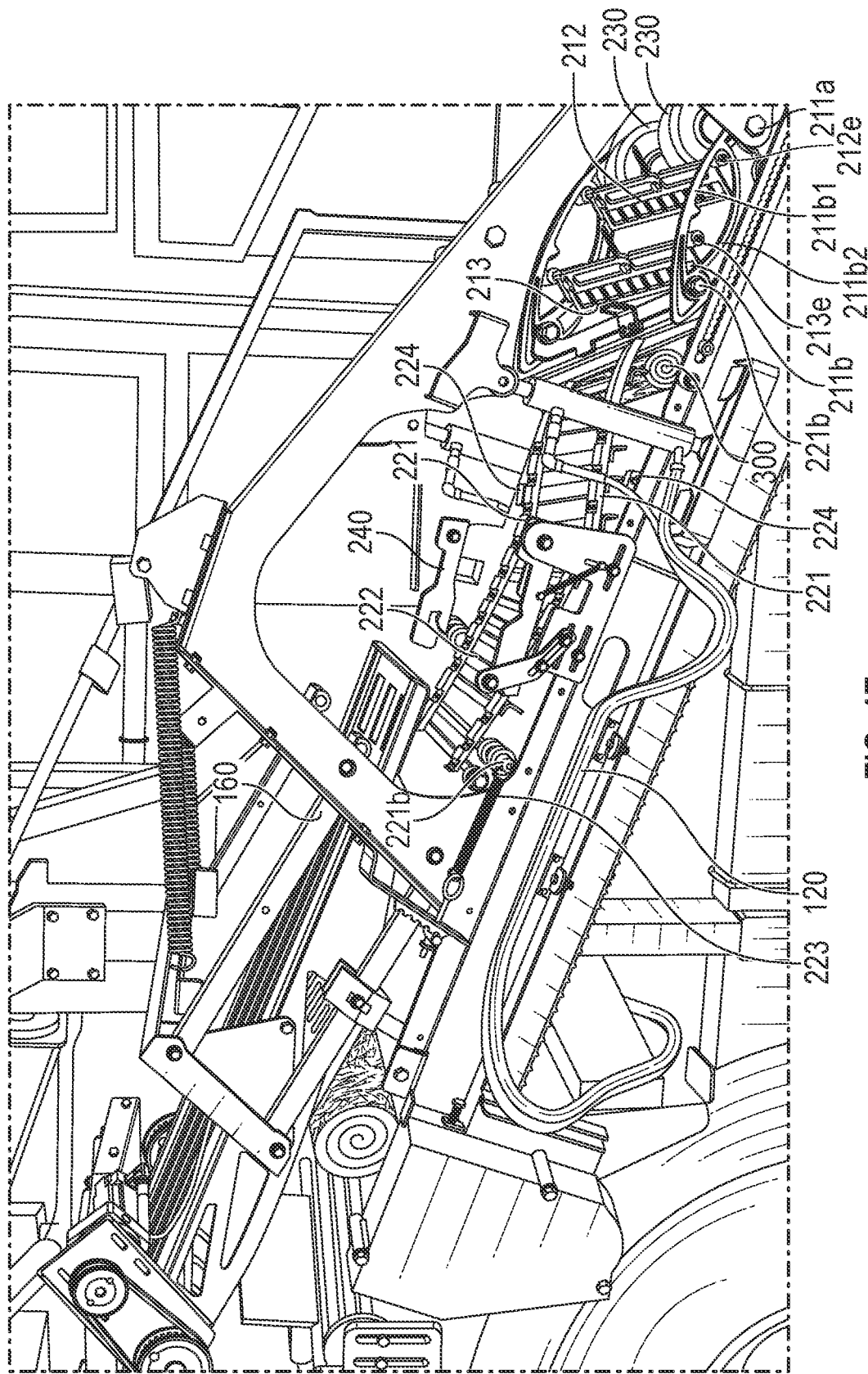

FIGS. 4A-4I correspond with the sequence depicted in FIGS. 3A-3G but provide a side view. In FIG. 4A, a slab has not yet been advanced to roll starter 210 and therefore corresponds with FIG. 3A. In FIG. 4B, slab 300 has contacted and lifted front slab flipper 212. Stoppers 212e have contacted top arms 211b1 and started to lift pivoting supports 211. In FIG. 4C, the roll being formed from slab 300 has advanced to contact and lift rear slab flipper 213. Stoppers 213e have therefore contacted top arms 211b1. In FIG. 4D, the size of the forming roll 300 has increased thereby further lifting rear slab flipper 213 and in turn lifting pivoting supports 211 around pivot points 211a. In FIG. 4E, the forming roll 300 has advanced to be positioned under roll advancer 220. As a result, rear slab flipper 213 has dropped so that stoppers 211e no longer contact top arms 211b1. Pivoting supports 211 have therefore rotated slightly downwardly with the force of gravity, which in turn ensures that a downward force is maintained on the forming roll.

Figure 4F:
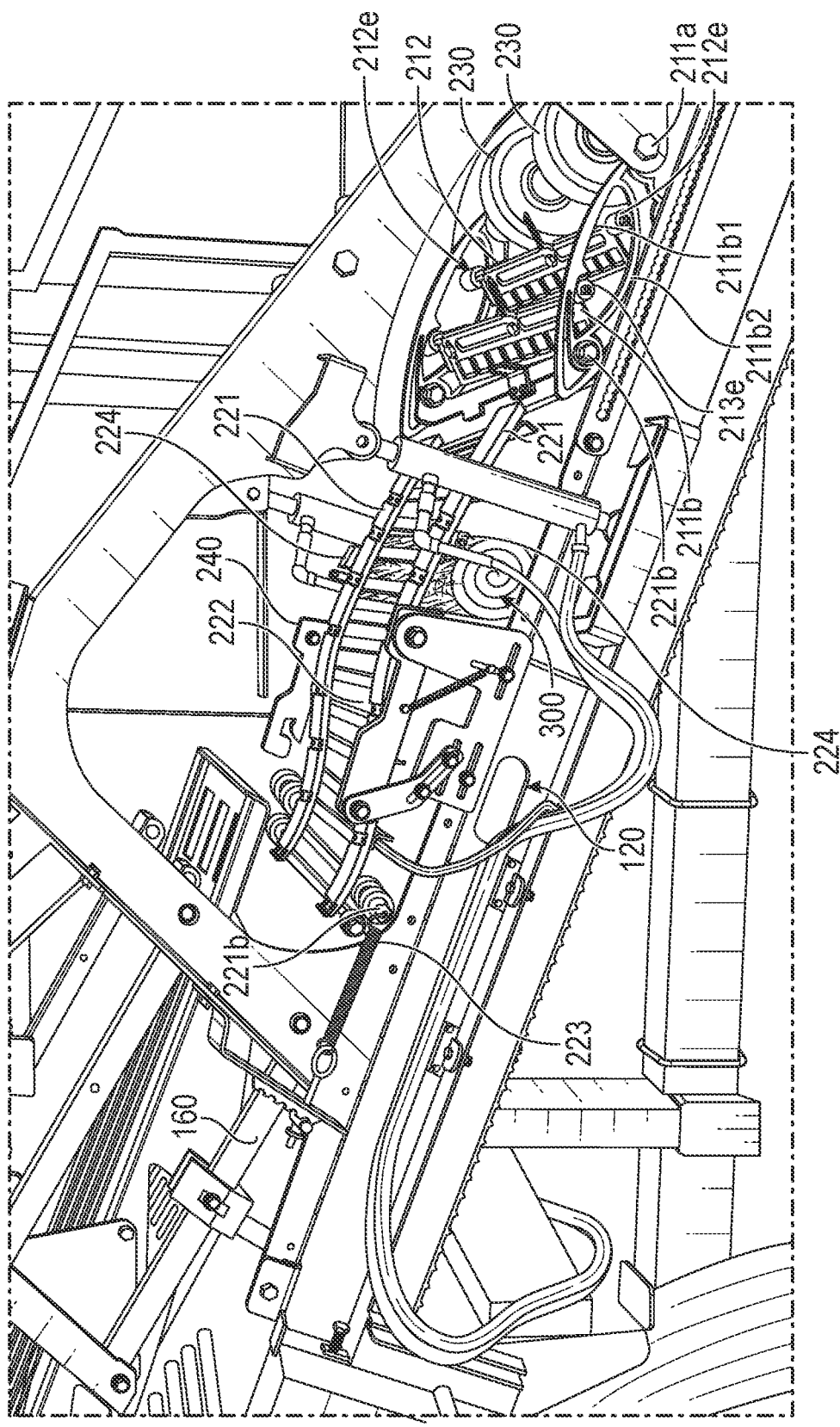
Figure 4G:
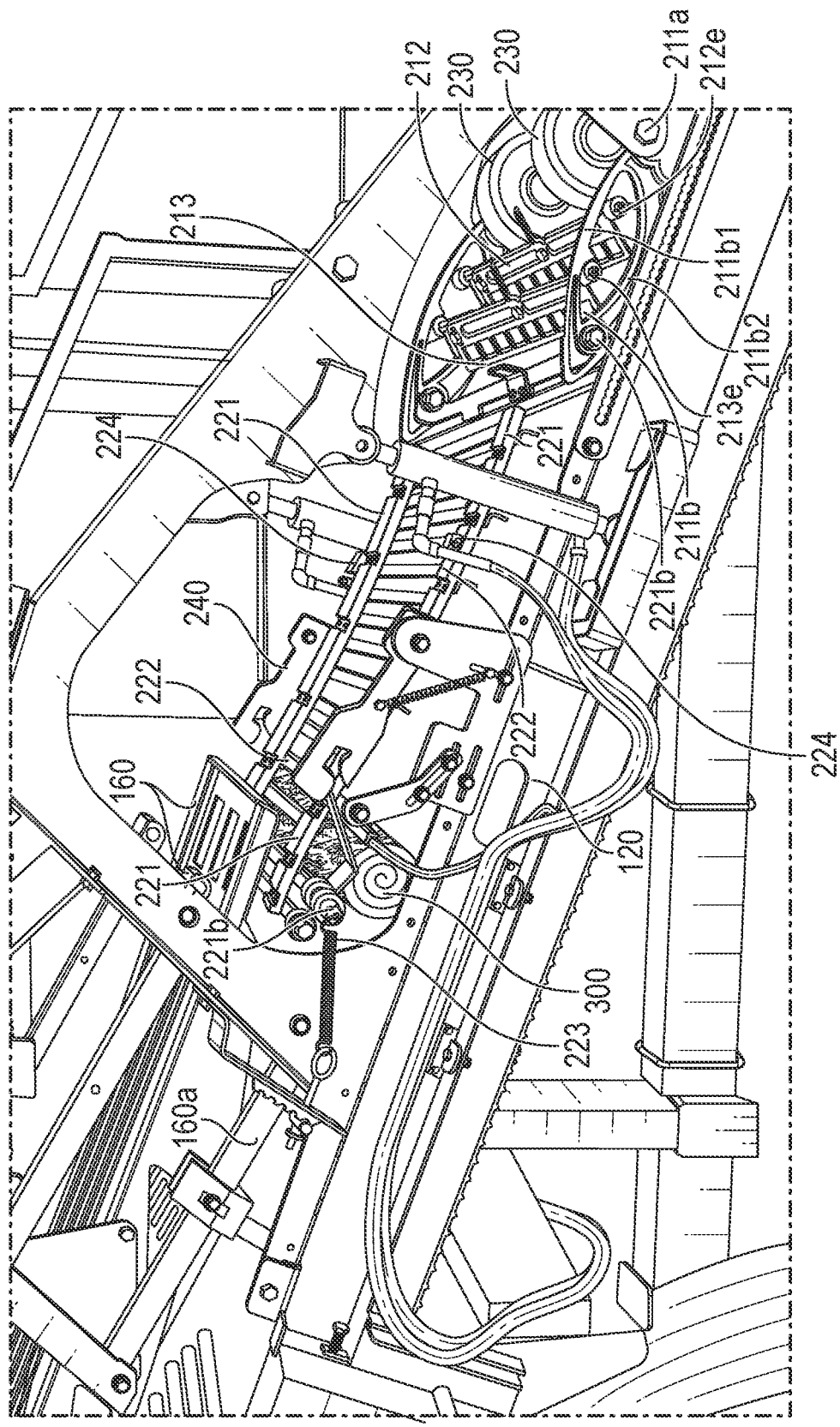

In FIG. 4F, the forming roll 300 has further travelled under roll advancer 220. Because suspended supports 221 are suspended from front attachment points 221a and rear attachment points 221b, blades 222 will generally conform to the shape of the forming roll 300 as is travels. In FIG. 4G, the forming roll 300 has reached rear attachment points 221b. Because rear attachment points 221b are suspended from frame 120a via tension members 223, roll advancer 220 at rear attachment points 221a can be lifted to conform to the shape/size of the forming roll. FIG. 4G also shows that roll transfer mechanism 160 can be positioned so that its upper conveyor 160a is spaced from inclined conveyor 120 a suitable amount to receive the forming roll.

Figure 4H:
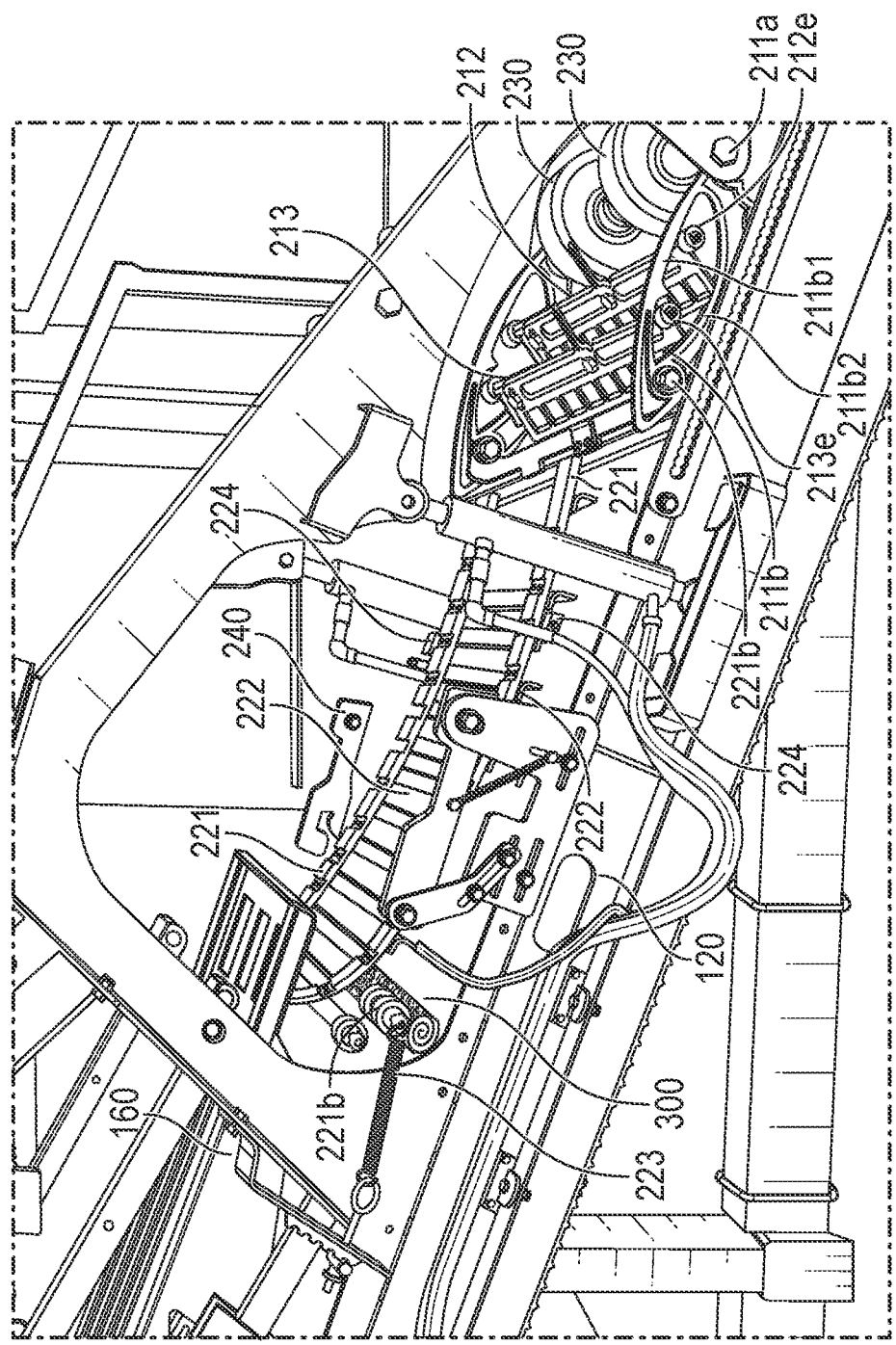
Figure 4I:
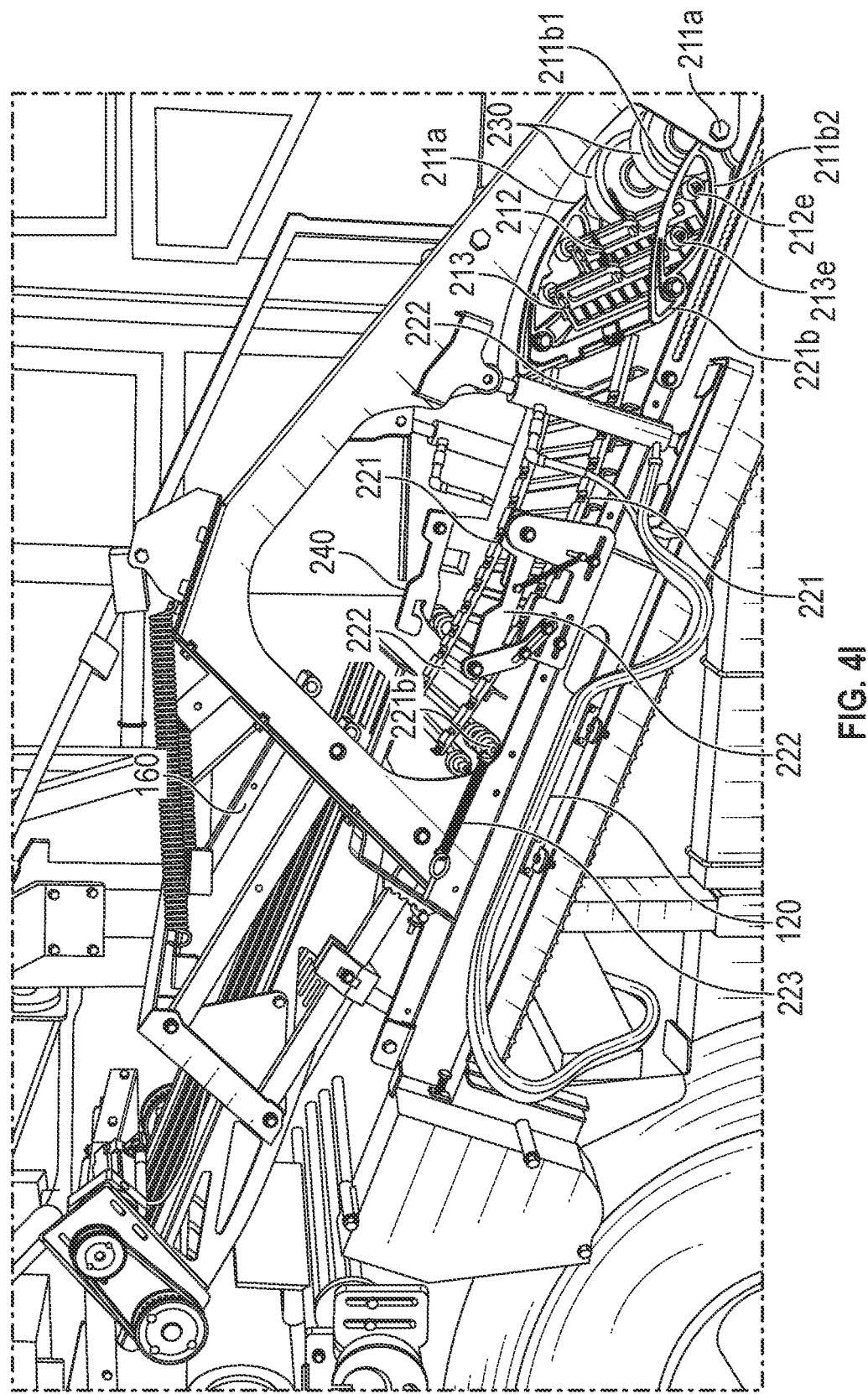

In FIG. 4H, the forming roll 300 is transitioning to roll transfer mechanism 200 while the trailing end of the slab is still positioned under roll starter 210 and roll advancer 220. FIG. 4H is therefore intended to represent that, in some embodiments, roll forming mechanism 200 may form an incomplete roll and transfer the incomplete roll to roll transfer mechanism which will complete the roll and then deliver the completed roll to stacking conveyor 130. In FIG. 4I, the trailing edge of the slab has advanced beyond roll starter 210, which in turn has caused roll starter 210 to return to the position shown in FIG. 4A to await the next slab.

Figure 5B:
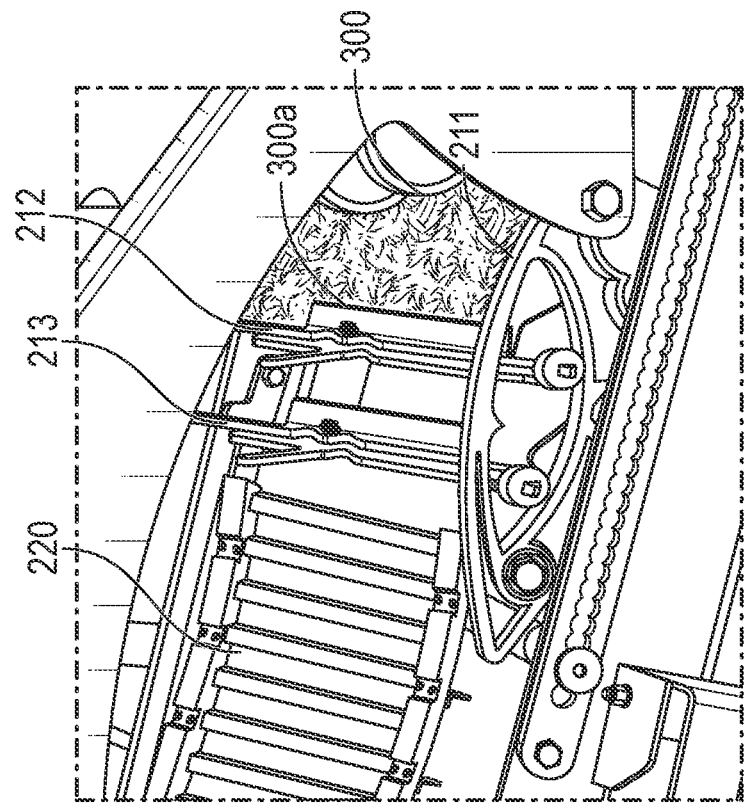
FIGS. 5A-5F provide another side view of a sequence in which a sod roll forming mechanism configured in accordance with some embodiments of the present invention initiates the formation of a sod roll
Figure 5A:
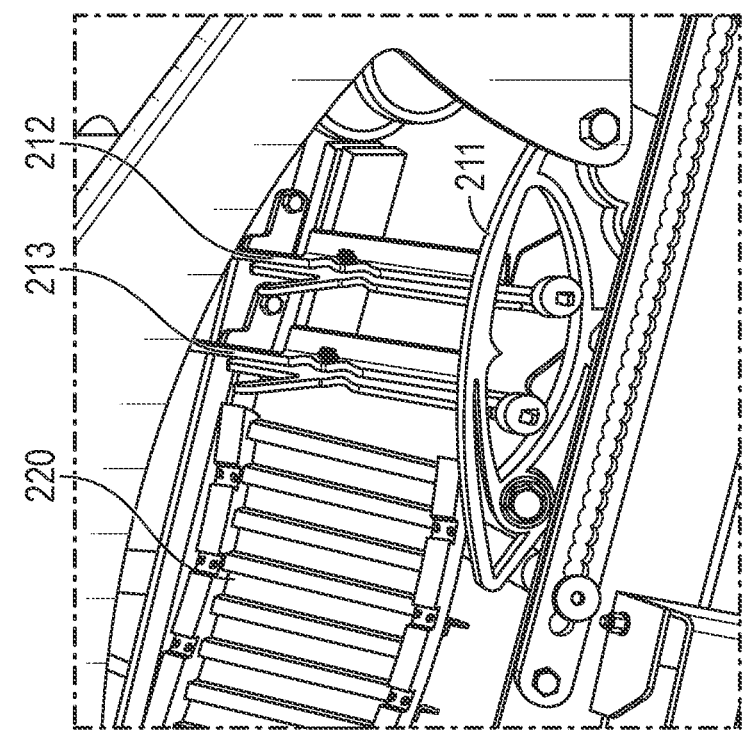
Figure 5C:
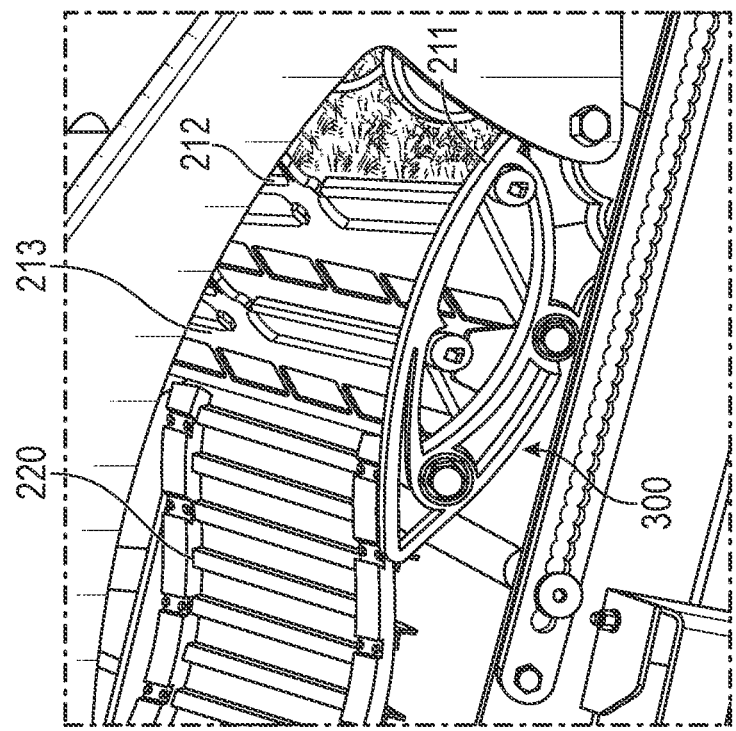
Figure 5D:
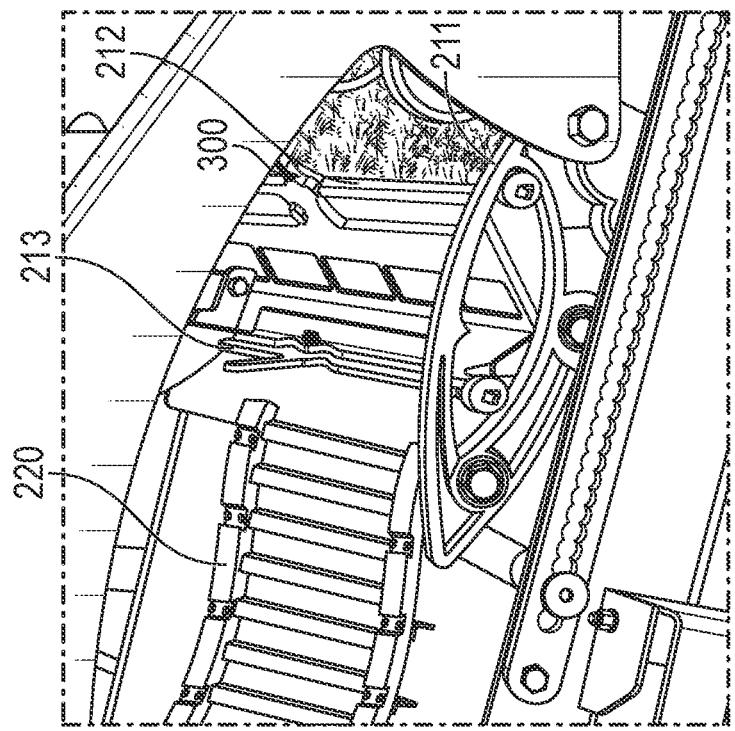
Figure 5F:
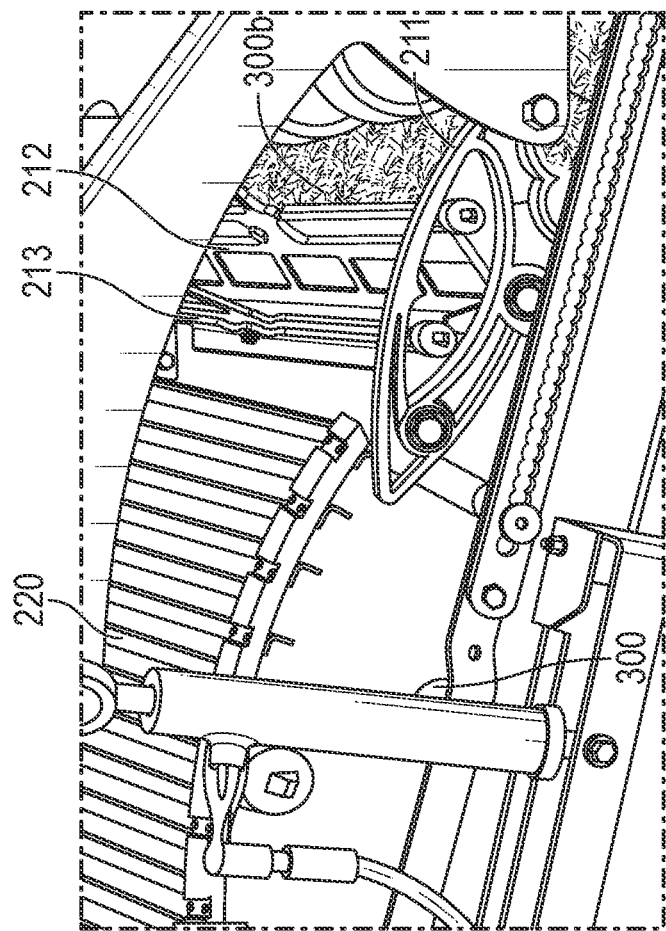
Figure 5E:
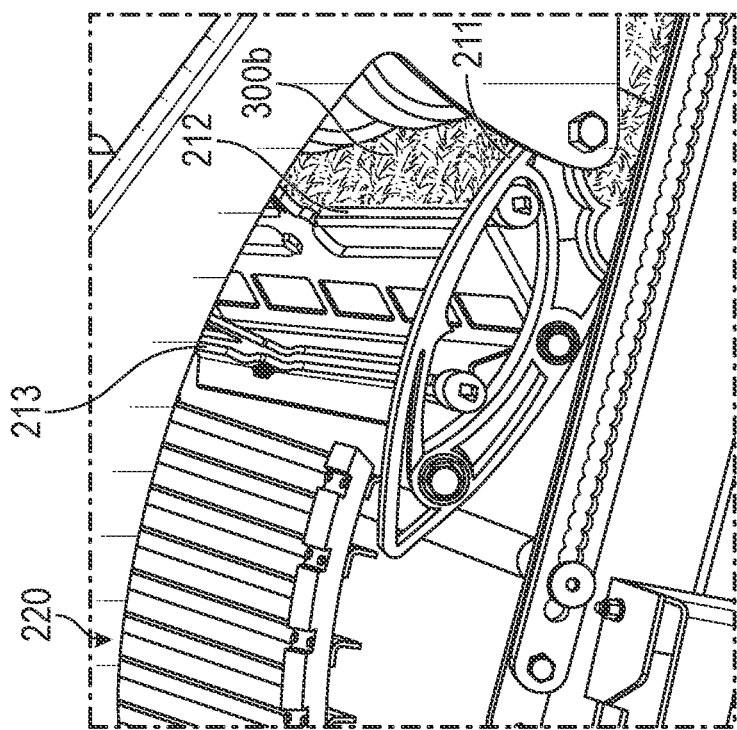

FIGS. 5A-5F also correspond with the sequence depicted in FIGS. 3A-3G but focus on roll starter 210. In FIG. 5A, a roll has not yet reached roll starter 210. Then, in FIG. 5B, the leading edge 300a of a slab 300 has reached front slab flipper 212. In FIG. 5C, the forming roll 300 has lifted front slab flipper 212 causing pivoting supports 211 and rear slab flipper 213 to also be lifted. In FIG. 5D, the forming roll 300 has lifted rear slab flipper 213 causing pivoting supports 211 to be further lifted. In FIG. 5E, the forming roll 300 has passed under roll advancer 220 allowing rear slab flipper 213 to descend. Roll advancer 220 slightly lifts pivoting supports 211 via roll advancer connection points 211c. In FIG. 5F, the forming roll 300 has further traveled under roll advancer 220 allowing pivoting supports 211 to descend.

FIGS. 5A-5F highlight that bottom arm 211b2 may have a U-shape in some embodiments. This U-shape causes stoppers 212e of front slab flipper 212 to contact both top arm 211b1 and a vertical portion of bottom arm 211b2 when front slab flipper 212 is pivoted upwardly. Protrusion 211f on top arm 211b1 creates a similar structure for stoppers 213e of rear slab flipper 213 to contact.

In summary, the configuration of roll starter 210 can ensure that the leading edge of slabs are consistently and tightly rolled back to initiate roll formation. Likewise, the configuration of roll advancer 220, including its interface with roll starter 210, can ensure that the rolls remain consistent and tight as they continue to be formed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A sod harvester comprising:
a cutting head that removes slabs of sod from the ground;
an inclined conveyor that receives the slabs of sod from the cutting head and advances the slabs of sod towards a stacking conveyor;
a roll forming mechanism positioned above the inclined conveyor, the roll forming mechanism forming the slabs of sod into rolls and including a roll starter comprising:
pivoting supports positioned on opposing sides of the inclined conveyor, each pivoting support having a front end and a back end, the front end being connected to a frame of the sod harvester via a pivoting connection such that the rear end is configured to pivot upwardly away from the inclined conveyor; and
a front slab flipper having a vertical blade that extends across the inclined conveyor, the front slab flipper being configured to pivot relative to the pivoting supports;
the stacking conveyor that receives the rolls; and
a stacking head that removes the rolls from the stacking conveyor for stacking.

2. The sod harvester of claim 1, wherein the roll starter further comprises:
a rear slab flipper having a vertical blade that extends across the inclined conveyor.

3. The sod harvester of claim 2, wherein the rear slab flipper is configured to pivot relative to the pivoting supports.

4. The sod harvester of claim 2, wherein the front slab flipper includes a horizontal blade and the rear slab flipper includes a horizontal blade.

5. The sod harvester of claim 1, wherein each pivoting support includes a top arm, and wherein the front slab flipper includes stoppers that contact the top arms when the front slab flipper pivots upwardly relative to the pivoting supports and cause the pivoting supports to also pivot upwardly.

6. The sod harvester of claim 5, wherein the roll starter further comprises:
a rear slab flipper having a vertical blade that extends across the inclined conveyor, the rear slab flipper being configured to pivot relative to the pivoting supports, the rear slab flipper including stoppers that contact the top arms when the rear slab flipper pivots upwardly relative to the pivoting supports and cause the pivoting supports to also pivot upwardly.

7. The sod harvester of claim 6, wherein each pivoting support includes a bottom arm, the bottom arms causing the rear slab flipper to be lifted when the pivoting supports pivot upwardly.

8. The sod harvester of claim 7, wherein the bottom arms cause the rear slab flipper to be lifted when the pivoting supports are pivoted upwardly in response to the stoppers of the front slab flipper contacting the top arms.

9. The sod harvester of claim 8, wherein the stoppers of the front slab flipper contact the top arms in response to the slabs contacting the vertical arm of the front slab flipper.

10. The sod harvester of claim 1, wherein the roll forming mechanism further includes a roll advancer comprising:
suspended supports positioned on the opposing sides of the inclined conveyor; and
blades that extend between the suspended supports across the inclined conveyor.

11. The sod harvester of claim 10, wherein each suspended support forms a front attachment point that is coupled to a respective one of the pivoting supports and a rear attachment point that is coupled to the sod harvester via a tensioning member.

12. The sod harvester of claim 10, further comprising:
a roll transfer mechanism that receives the rolls from the roll forming mechanism and delivers the rolls to the stacking conveyor.

13. The sod harvester of claim 12, wherein the roll transfer mechanism completes the rolls before delivering the rolls to the stacking conveyor.

14. A roll forming mechanism for a sod harvester comprising:
a roll starter comprising:

pivoting supports positioned on opposing sides of an inclined conveyor of the sod harvester, each pivoting support having a front end and a back end, the front end being connected to a frame of the sod harvester via a pivoting connection such that the rear end is configured to pivot upwardly away from the inclined conveyor; and a front slab flipper having a vertical blade that extends between the pivoting supports, the front slab flipper pivoting relative to the pivoting supports; and a roll advancer positioned rearward from the roll starter, the roll advancer comprising:

opposing suspended supports; and blades that extend between the opposing suspended supports.

15. The roll forming mechanism of claim 14, wherein the roll starter further comprises:

a rear slab flipper having a vertical blade that extends between the pivoting supports, the rear slab flipper pivoting relative to the pivoting supports.

16. The roll forming mechanism of claim 15, wherein the front slab flipper includes a horizontal blade and the rear slab flipper includes a horizontal blade.

17. The roll forming mechanism of claim 16, wherein each opposing suspended support is coupled to a respective one of the pivoting supports at a roll advancer connection point at the rear end of the pivoting support.

18. The roll forming mechanism of claim 17, wherein each pivoting support includes a top arm and a bottom arm, the front slab flipper contacting the top arms when the front slab flipper pivots upwardly thereby causing the pivoting supports to also pivot upwardly, the upward pivoting of the pivoting supports causing the bottom arms to lift the rear slab flipper.

19. The roll forming mechanism of claim 18, wherein the rear slab flipper contacts the top arms when the rear slab flipper pivots upwardly thereby causing the pivoting supports to also pivot upwardly.

20. A roll forming mechanism for a sod harvester comprising:

a roll starter comprising:

pivoting supports positioned on opposing sides of an inclined conveyor of the sod harvester, each pivoting support having a front end and a back end, the front end being connected to a frame of the sod harvester via a pivoting connection such that the rear end is configured to pivot upwardly away from the inclined conveyor;

a front slab flipper having a vertical blade that extends between the pivoting supports and a horizontal blade that extends frontward from the vertical blade of the front slab flipper, the front slab flipper pivoting relative to the pivoting supports; and a rear slab flipper having a vertical blade that extends between the pivoting supports and a horizontal blade that extends frontward from the vertical blade of the rear slab flipper, the rear slab flipper pivoting relative to the pivoting supports; and a roll advancer positioned rearward from the roll starter, the roll advancer comprising:

opposing suspended supports; and blades that extend between and are spaced along the opposing suspended supports.

\* \* \* \* \*